US009196023B1

(12) United States Patent
Poole

(10) Patent No.: US 9,196,023 B1
(45) Date of Patent: Nov. 24, 2015

(54) METHOD AND APPARATUS FOR ADJUSTING A PROPERTY OF AN IMAGE BASED ON ROTATIONS OF A TRANSFER FUNCTION

(71) Applicant: Marvell International Ltd., Hamilton (BM)

(72) Inventor: David K. Poole, Boise, ID (US)

(73) Assignee: Marvell International Ltd., Hamilton (BM)

( * ) Notice: Subject to any disclaimer, the term of this patent is extended or adjusted under 35 U.S.C. 154(b) by 261 days.

(21) Appl. No.: 13/752,795

(22) Filed: Jan. 29, 2013

Related U.S. Application Data

(60) Provisional application No. 61/595,353, filed on Feb. 6, 2012, provisional application No. 61/732,093, filed on Nov. 30, 2012.

(51) Int. Cl.
*G06T 5/00* (2006.01)
*G06K 9/00* (2006.01)
(52) U.S. Cl.
CPC ...................................... *G06T 5/007* (2013.01)
(58) Field of Classification Search
None
See application file for complete search history.

(56) References Cited

U.S. PATENT DOCUMENTS

| 7,215,813 | B2 * | 5/2007 | Graves et al. | 382/167 |
| 7,714,901 | B2 * | 5/2010 | Li | 348/222.1 |
| 8,073,285 | B2 * | 12/2011 | Curtis | 382/274 |
| 2010/0278422 | A1 * | 11/2010 | Iketani | 382/165 |

* cited by examiner

*Primary Examiner* — Ashish K Thomas
*Assistant Examiner* — Neil R McLean

(57) ABSTRACT

Some of the embodiments of the present disclosure provide a method comprising receiving an input image; based on the input image, generating a first output image, such that a contrast of the first output image is the same as a contrast of the input image; generating a first line in an x-y plane, wherein the first line represents a transfer function between (i) pixel values of pixels of the input image and (ii) pixel values of pixels of the first output image; receiving an input to modify the contrast of the input image; and based on receiving the input to modify the contrast of the input image, (i) rotating the first line to generate a second line in the x-y plane, and (ii) based on the second line, generating a second output image having a contrast that is different from the contrast of the input image.

20 Claims, 6 Drawing Sheets

Input image 104 and the baseline output image 112a

Output image 112b, formed by decreasing the contrast of the input image 104

Output image 112c, formed by increasing the contrast of the input image 104

No Change

Increase contrast

Decrease contrast

METHOD AND APPARATUS FOR ADJUSTING A PROPERTY OF AN IMAGE BASED ON ROTATIONS OF A TRANSFER FUNCTION

CROSS REFERENCE TO RELATED APPLICATIONS

The present disclosure claims priority to U.S. Provisional Patent Application No. 61/595,353, filed on Feb. 6, 2012, and to U.S. Provisional Patent Application No. 61/732,093, filed on Nov. 30, 2012, which are incorporated herein by reference.

TECHNICAL FIELD

Embodiments of the present disclosure relate to image processing, and more particularly, to techniques for adjusting a property of an image.

BACKGROUND

An image typically has many properties—including for example, hue, tint, shade, tone, brightness, lightness, chroma, contrast, and so on. For example, hue defines color in terms of, for example, red, green or magenta. Hue also defines mixtures of two pure colors like red-yellow (e.g., orange), yellow-green, or the like. A tint is a mixing result of an original color to white. If an image has been tinted, it implies that white has been added to the original color. A shade is a mixing result of an original color to black. If an image has been shaded, it implies that black has been added to the original color. A tone implies a result of mixing a pure color with any neutral/grayscale color, including the two extremes white and black. Brightness is an attribute of human perception, which is mainly influenced by a color's lightness. For one color of specific hue, the perception of brightness is also more intense if saturation is increased. A higher level of saturation makes a color look brighter. Lightness defines a range from dark (0%) to fully illuminated (100%). Any original hue has an average lightness level of 50%. A chromatic signal is a component of color perception that is not achromatic, i.e. any deviation from neutral-color perception (dark, grayscale, etc.). A chromatic intensity or chromaticity is an intensity of the chromatic signal contributing to color perception. Chroma is a component of a color model. For example, there is a blue-yellow and a red-green chroma component. The contrast of an image can be defined as a difference between a darkest area and a brightest area of various objects, or as a difference between a darkest area and a brightest area of different regions within a common view of the image. Increasing contrast of the image increases the difference between dark and bright areas of the image, while decreasing contrast of the image decreases the difference between dark and bright areas of the image. It is desirable, for aesthetic, visual, or other reasons, to easily modify or adjust a property (e.g., the contrast) of an image.

SUMMARY

In various embodiments, the present disclosure describes a method comprising receiving an input image; based on the input image, generating a first output image, such that a contrast of the first output image is the same as a contrast of the input image; generating a first line in an x-y plane, wherein the first line represents a transfer function between (i) pixel values of pixels of the input image and (ii) pixel values of pixels of the first output image; receiving an input to modify the contrast of the input image; and based on receiving the input to modify the contrast of the input image, (i) rotating the first line to generate a second line in the x-y plane, and (ii) based on the second line, generating a second output image having a contrast that is different from the contrast of the input image In various embodiments, the present disclosure further describes an image processing system comprising a user input module configured to receive an input to modify a contrast of an input image; and a contrast modification module configured to receive the input image, based on the input image, generate a first output image, such that a contrast of the first output image is the same as a contrast of the input image, generate a first line in an x-y plane, wherein the first line represents a transfer function between (i) pixel values of pixels of the input image and (ii) pixel values of pixels of the first output image, and based on the input to modify the contrast of the input image, (i) rotate the first line to generate a second line in the x-y plane, and (ii) based on the second line, generate a second output image having a contrast that is different from the contrast of the input image.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
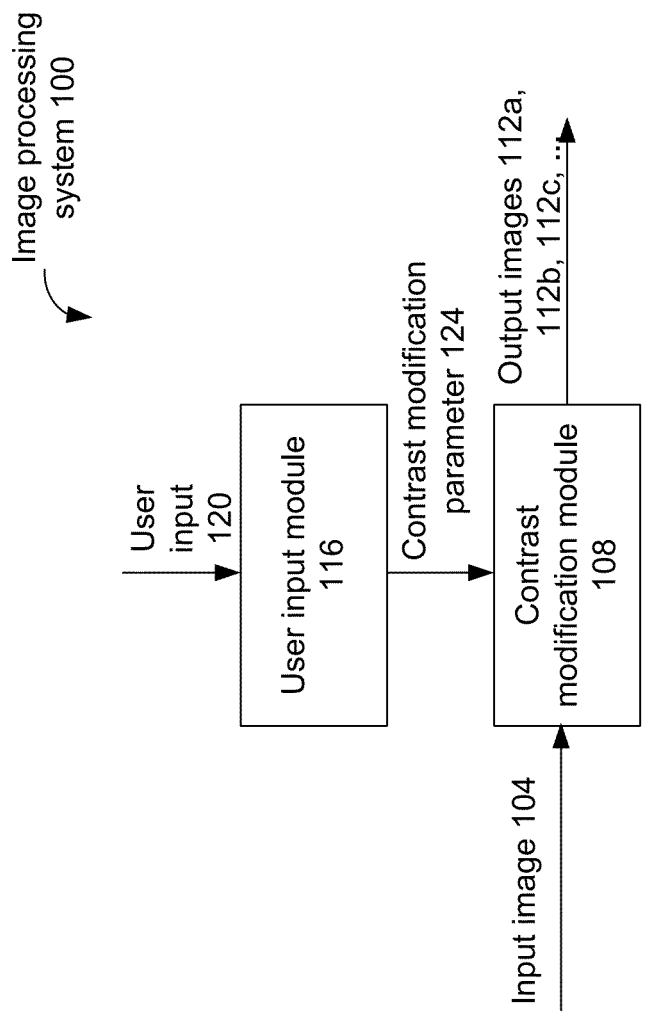
FIG. 1 schematically illustrates an image processing system configured to modify a property (e.g., contrast) of an image.

FIG. 1 schematically illustrates an image processing system 100 (henceforth referred to as "system 100") configured to modify a property (e.g., contrast) of an image. While the techniques disclosed herein are described in connection with adjusting the contrast of an image, such techniques are applicable more generally for adjusting other properties of an image—e.g., hue, tint, brightness, contrast, tone, lightness, sharpness, chroma, and so on. The system 100 comprises a user input module 116 configured to receive an input (referred to herein as user input 120) from a user of the system 100. In an embodiment, the user input 120 is input by the user to change a contrast of an input image 104. Based on the user input 120, the user input module 116 is configured to generate a parameter (e.g., a contrast modification parameter 124) to modify the contrast of the input image 104.

The system 100 further comprises a contrast modification module 108 configured to receive the input image 104 and the contrast modification parameter 124. Based on the contrast modification parameter 124, the contrast modification module 108 is configured to selectively modify the contrast of the input image 104. For example, the contrast modification module 108 outputs one or more output images 112a, 112b, 112c, and so on, by modifying the contrast of the corresponding input image 104.

In an embodiment, the system 100 is included, for example, in an image processing device, such as a scanner, a photo copier, a multi function printer (which, for example, includes scanning capabilities), a camera, and/or other appropriate image processing devices. In an example, the image processing device has scanning or photo-copying capabilities (e.g., the image processing device is a scanner, a photo copier, a multi function printer, or the like), and the image processing device generates the input image 104 based on scanning or copying a document. In another example, the image processing device is a camera, and the input image 104 is generated by capturing a picture by the camera. In an embodiment, the input image 104 is a grayscale or a monochrome image, while in another embodiment, the input image 104 is a color image.

The input image 104 comprises a plurality of pixels, with each pixel associated with a corresponding pixel value. The pixel value of a pixel of the input image 104 can range, for example, from 0 to 255 (although any other appropriate range, e.g., 0 to 1023, may also be possible). For example, if the pixel values range from 0 to 255 (e.g., for a red, green and blue (RGB) color plane), then a pixel value of 0 indicates that the corresponding pixel represents black, and a pixel value of 255 indicates that the corresponding pixel represents white. In an embodiment, the lower the pixel value of a pixel, the darker the pixel; and the higher the pixel value, the lighter the pixel.

In an embodiment, and as will be discussed in more detail herein later, the contrast modification module 108 may selectively decrease, increase or not change a pixel value of a pixel of the input image 104, to generate a pixel value of a corresponding pixel of an output image (e.g., output image 112a, 112b, or 112c). Thus, each pixel of the output image has a corresponding pixel in the input image 104. For example, each pixel of the output image is generated (e.g., by the contrast modification module 108) based on a pixel value of the corresponding pixel in the input image 104.

Figure 2A:
FIGS. 2A-2C illustrate output images generated by the image processing system of FIG. 1.

FIG. 2A illustrates the input image 104 received by the contrast modification module 108. In an embodiment, the contrast modification module 108 outputs an output image 112a such that a contrast of the output image 112a is same as a contrast of the input image 104. That is, the output image 112a is generated from the input image 104, without modifying the contrast of the input image 104. In an embodiment, the output image 112a and the input image 104 represent the same image (i.e., FIG. 2A illustrates both the input image 104 and the output image 112a). As the output image 112a is generated from the input image 104 without modifying the contrast of the input image 104, the output image 112a is also termed herein as a baseline output image.

Figure 3:
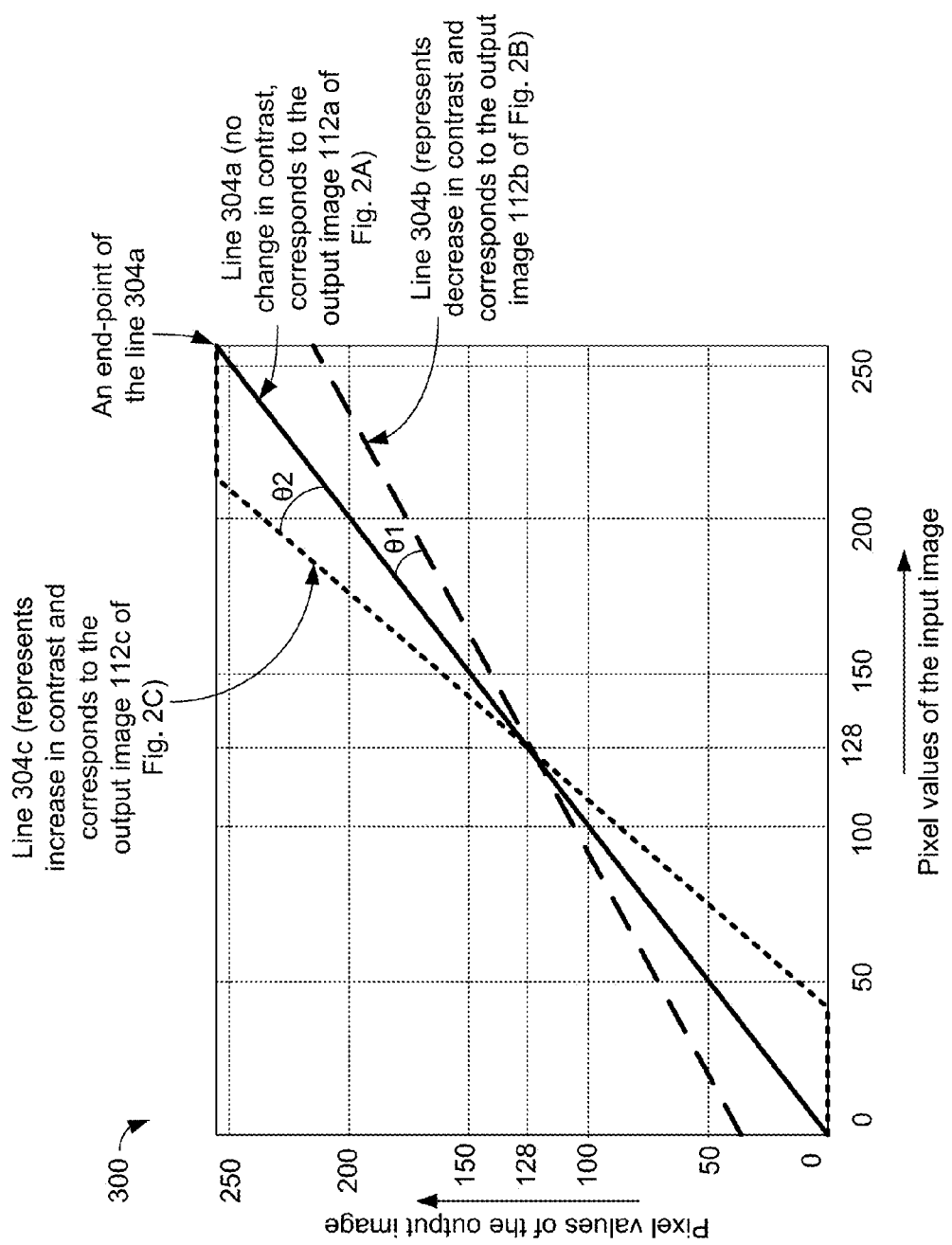
FIG. 3 illustrates a mapping between pixel values of an input image and pixel values of various output images.

FIG. 3 illustrates a mapping between pixel values of the input image 104 and pixel values of example output images 112a, 112b and 112c. The mapping in FIG. 3 is illustrated in a form of a graph 300, with the X-axis representing pixel values of pixels of the input image 104 and the Y-axis representing pixel values of pixels of the output images 112a, 112b and 112c. In the example graph 300 of FIG. 3, the range of pixel values of the input image 104 and the output images 112a, 112b and 112c is assumed to be between 0 and 255, although other appropriate ranges of the pixel values may also be possible.

As previously discussed, the baseline output image 112a (illustrated in FIG. 2A) is generated from the input image 104, without modifying the contrast of the input image 104. A line 304a (e.g., a straight line) of FIG. 3 illustrates the mapping between the pixel values of the pixels of the baseline and the input image 104. That is, the line 304a is an indication of a transfer function between the pixel values of the pixels of the baseline output image 112a and the input image 104. As the baseline output image 112a is generated without modifying the contrast of the input image 104, a pixel value of a pixel of the baseline output image 112a is the same as a pixel value of a corresponding pixel of the input image 104. Thus, the line 304a is a straight line passing through the origin of the graph 300 (i.e., the (0,0) coordinate of the graph 300) and having a slope of 1 (i.e., the line 304 is at an angle of 45° with the x-axis and the y-axis of the graph 300). Accordingly, the line 304a maps a pixel value of a pixel of the input image 104 to the same pixel value of the corresponding pixel of the baseline output image 112a. Furthermore, the line 304a passes through the (128,128) coordinate of the graph 300, which forms a mid-point of the line 304a. As previously discussed, since the output image 112a is generated from the input image 104 without modifying the contrast of the input image 104, the output image 112a is also termed herein as the baseline output image, and the line 304a is also termed herein as a baseline line or a baseline mapping.

In an embodiment, a user of the system 100 may desire to change a contrast of the input image 104. Merely as an example, if the input image 104 represents an image of an old store receipt in which the printing has somewhat faded, the user may want to increase the contrast of the input image 104 (e.g., while scanning the receipt as the input image 104) so that the printing in the old receipt is more prominent and visible. Merely as another example, if the input image 104 represents an image of an old newspaper in which the background white portion has been discolored to light yellow, the user may want to decrease the contrast of the input image 104 (e.g., while scanning the newspaper as the input image 104) so that the light yellow background becomes less prominent and the actual printing in the newspaper is more visible. The user may want to increase or decrease the contrast of the input image 104 for aesthetic, visual or various other reasons.

Figure 4A:
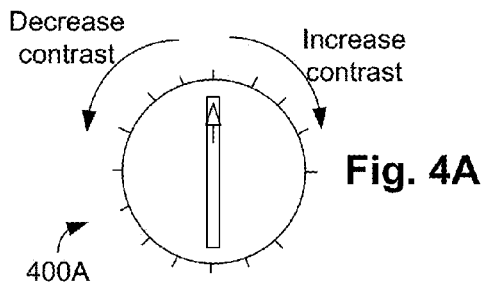
FIGS. 4A and 4B illustrate dials that can be rotated to modify a property (e.g., contrast) of an input image.
Figure 4B:
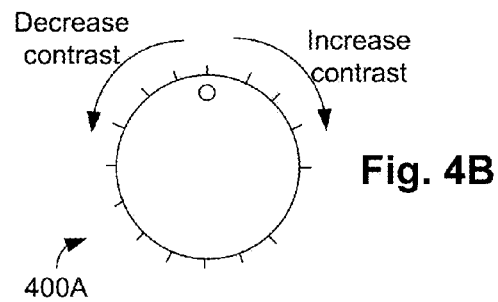

Referring again to FIG. 1, in an embodiment, the user input module 116 comprises an appropriate interface to receive an input from a user of the system 100. For example, the user uses the user input module 116 to selectively increase or decrease the contrast of the input image 104. FIGS. 4A and 4B illustrate examples of the user input module 116. For example, FIG. 4A illustrates a dial 400A that may be rotated to change a contrast of the input image 104. For example, at a baseline position (e.g., at a vertical position, as illustrated in FIG. 4A), the dial 400A indicates no change in contrast of the input image 104. When rotated clockwise, the dial 400A indicates an input by the user to increase the contrast of the input image 104. For example, the more the dial 400A is rotated clockwise, the higher the increase in contrast of the input image 104. Similarly, when rotated counter-clockwise, the dial 400A indicates an input by the user to decrease the contrast of the input image 104.

In an example, a mapping between the rotation of the dial 400A and the change in the contrast is linear. For example, for each 1° rotation of the dial in the clockwise direction, the contrast of the input image 104 is increased by a pre-set amount (e.g., by a preset percentage).

In another example, the mapping between the rotation of the dial 400A and the change in the contrast is non-linear. For example, for first 10° rotation of the dial 400A in the clockwise direction from the baseline position, the contrast of the input image 104 is increased by a first pre-set amount (e.g., by a first preset percentage); and for an additional 10° rotation of the dial 400A in the clockwise direction, the contrast of the input image 104 is increased by a second pre-set amount (e.g., by a second preset percentage), such that the first pre-set amount is different from the second pre-set amount. For example, the first pre-set amount is higher than the second pre-set amount. For example, the user may turn the dial 104 slightly clockwise from the baseline position, which results in a relatively higher increase in contrast, thereby providing the user with a visible change in the contrast of the input image 104. When the user further turns the dial 104 slightly clockwise, the increase in the contrast is relatively low. This ensures that, for example, the user changes the contrast of the input image 104 significantly with slight initial rotation of the dial 400A from the baseline position of the dial 400A.

FIG. 4B illustrates another example dial 400B for changing the contrast of the input image 104. The dial 400B may operate, for example, in a manner that is similar to that of the dial 400A.

Although FIGS. 4A and 4B illustrate example implementations of the user input module 116, the user input module 116 may be implemented in any other appropriate manner. In an example, although not illustrated in the figures, user input module 116 comprises a dial, a slide bar, one or more buttons (or other appropriate shapes) displayed on a graphical user interface (e.g., on a screen of a display device associated with the system 100), or the like.

Referring again to FIG. 3, in an embodiment, the line 304a is rotated clockwise around a mid-point of the line 304a by an angle θ1, to generate a line 304b (e.g., such that the line 304b is a straight line). The line 304b maps pixel values of pixels of the input image 104 and the output image 112b (also illustrated in FIG. 2B). For the line 304b and for a relatively light pixel (e.g., having a pixel value of, for example, 200) of the input image 104, the corresponding pixel in the output image 112b is relatively less lighter (e.g., having a pixel value of, for example, 170). Similarly, for the line 304b and for a relatively dark pixel (e.g., having a pixel value of, for example, 50) of the input image 104, the corresponding pixel in the output image 112b is relatively less dark (e.g., having a pixel value of, for example, 70), as illustrated in FIG. 3. Thus, the line 304b represents a decrease in contrast in the corresponding output image 112b, compared to the input image 104 (and also compared to the baseline output image 112a).

Figure 2B:

In an embodiment, the line 304b and the corresponding output image 112b are generated based on the user requesting a decrease in the contrast of the input image 104. For example, the user indicates, using the user input module 116 (e.g., using the dial 400A or 400B), a request to decrease the contrast of the input image 104. Based on the request, the user input module 116 generates the contrast modification parameter 124, which provides an indication of a decrease in the contrast. For example, the contrast modification parameter 124 comprises the angle θ1 (which is generated based on, for example, the amount of rotation of the dial 400A) and an indication that the angle θ1 is associated with a decrease in the contrast. Once the contrast modification module 108 receives the contrast modification parameter 124, the contrast modification module 108 rotates the line 304a based on the contrast modification parameter 124 to generate the line 304b (e.g., the angle θ1, by which the line 304a is rotated to generate the line 304b, is based on the contrast modification parameter 124). Once the line 304b is generated, the contrast modification module 108 generates the output image 112b, based on the line 304b and the input image 104. As previously discussed and as also illustrated in FIGS. 2A and 2B, the contrast of the output image 112b is less than the contrast of the input image 104, and the decrease in the contrast is based on the user input 120 received by the user input module 116.

Similarly, in an embodiment, the line 304a is rotated counter-clockwise around the mid-point of the line 304a by an angle θ2, to generate a line 304c (e.g., such that the line 304c is a straight line). The line 304c maps pixel values of pixels of the input image 104 and the output image 112c (also illustrated in FIG. 2C). For the line 304c and for a relatively light pixel (e.g., having a pixel value of, for example, 200) of the input image 104, the corresponding pixel in an output image 112c is relatively lighter (e.g., having a pixel value of, for example, 240). Similarly, for the line 304b and for a relatively dark pixel (e.g., having a pixel value of, for example, 50) of the input image 104, the corresponding pixel in the output image 112b is relatively darker (e.g., having a pixel value of, for example, 20), as illustrated in FIG. 3. Thus, the line 304c represents an increase in contrast in the corresponding output image 112c, compared to the input image 104.

Figure 2C:

In an embodiment, the line 304c and the corresponding output image 112c are generated based on the user requesting an increase in the contrast of the input image 104. For example, the user indicates, using the user input module 116 (e.g., using the dial 400A or 400B), a request to increase the contrast of the input image 104. Based on the request, the user input module 116 generates the contrast modification parameter 124, which provides an indication of an increase in the contrast. For example, the contrast modification parameter 124 comprises the angle θ2 (which is generated based on, for example, the amount of rotation of the dial 400A) and an indication that the angle θ2 is associated with an increase in the contrast. Once the contrast modification module 108 receives the contrast modification parameter 124, the contrast modification module 108 rotates the line 304a based on the contrast modification parameter 124 to generate the line 304c (e.g., the angle θ2, by which the line 304a is rotated to generate the line 304c, is based on the contrast modification parameter 124). Once the line 304c is generated, the contrast modification module 108 generates the output image 112c, based on the line 304c and the input image 104. As previously discussed and as also illustrated in FIGS. 2A and 2C, the contrast of the output image 112c is more than the contrast of the input image 104, and the increase in the contrast is based on the user input 120 received by the user input module 116.

Figure 5A:
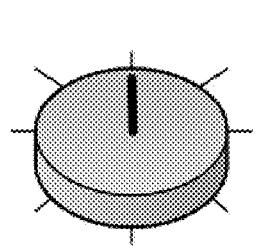
FIGS. 5A, 5B and 5C illustrate various positions of a dial and corresponding mappings of FIG. 3.
Figure 5A:
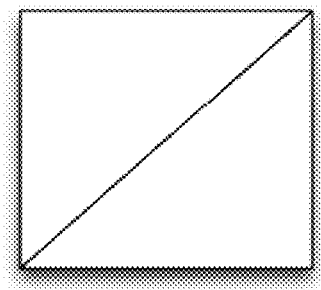
Figure 5B:
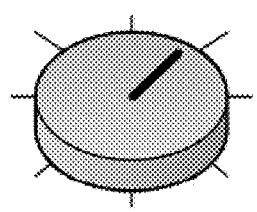
Figure 5B:
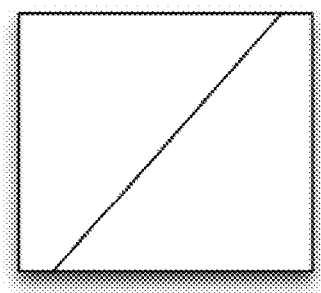
Figure 5C:
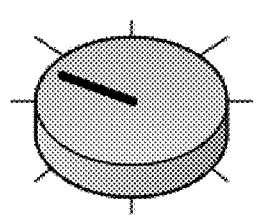
Figure 5C:
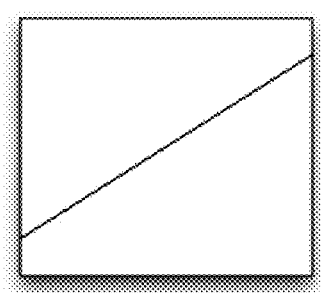

FIGS. 5A-5C illustrate example positions of the dial 400A of FIG. 4 and corresponding example mapping in the graph 300 of FIG. 3. For example, in FIG. 5A, the dial 400A is in the neutral or baseline position. Accordingly, the corresponding mapping in the graph 300 is represented by a baseline line that passes through the origin of the graph 300 (i.e., similar to the line 304a).

In FIG. 5B, the dial 400A is rotated clockwise to indicate an increase in the contrast. Accordingly, the baseline line in the graph 300 is rotated counter-clockwise (i.e., a line similar to the line 304c is generated, as illustrated in FIG. 5B), resulting in an increase in the contrast in the corresponding output image.

In FIG. 5C, the dial 400A is rotated counter-clockwise to indicate a decrease in the contrast. Accordingly, the baseline line in the graph 300 is rotated clockwise (i.e., a line similar to the line 304c is generated, as illustrated in FIG. 5C), resulting in a decrease in the contrast in the corresponding output image.

Figure 6:
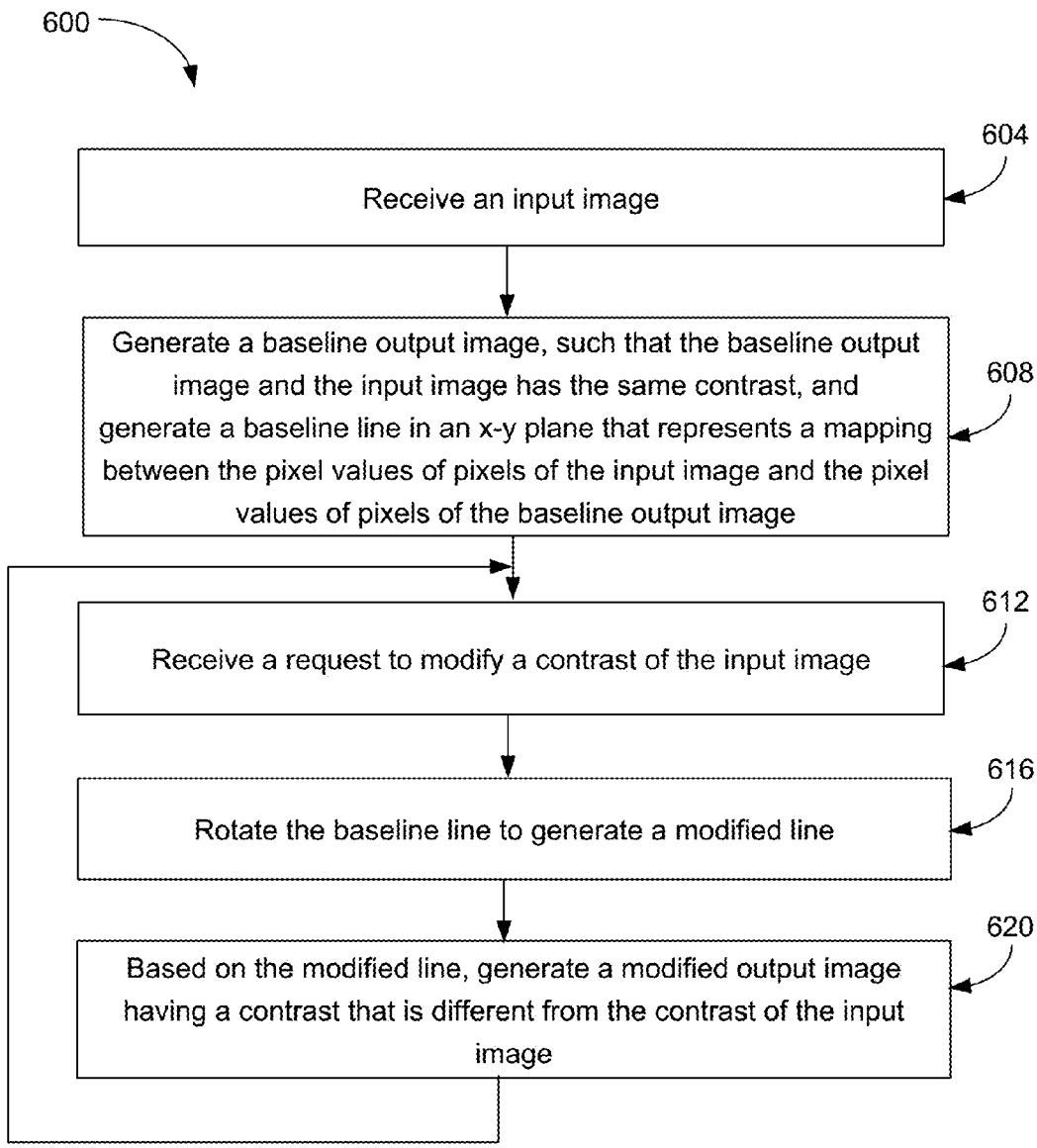
FIG. 6 illustrates an example method for operating an image processing system.

FIG. 6 illustrates an example method 600 for operating the system 100 of FIG. 1. At 604, an input image (e.g., input image 104) is received. At 608, a baseline output image (e.g., baseline output image 112a of FIG. 3) is generated (e.g., by the contrast modification module 108) from the input image, such that the baseline output image and the input image has the same contrast. Also at 608, a baseline line (e.g., line 304a) in an x-y plane is generated (e.g., by the contrast modification module 108), such that the baseline line represents a mapping (e.g., a transfer function) between the pixel values of pixels of the input image and the pixel values of pixels of the baseline output image. In an embodiment, the baseline line represents a transfer function between the input image and the baseline output image.

At 612, a request is received (e.g., in the form of the user input 120 by the user input module 116) to modify (e.g., increase or decrease) a contrast of the input image. For example, the user may rotate a dial (e.g., the dial 400A), actuate a slide bar, press a button or use any other appropriate user interface to request to modify the contrast of the input image. A contrast modification parameter (e.g., the contrast modification parameter 124) is generated based on receiving the request. In an embodiment, the contrast modification parameter provides an indication of whether the contrast is to be increased or decreased, and an amount by which the contrast is to be modified.

At 616, the baseline line is rotated (e.g., rotated around a mid-point of the baseline line by the contrast modification module 108) to generate a modified line (e.g., based on the contrast modification parameter). For example, if the request is for increasing the contrast, the baseline line is rotated counter-clockwise to generate the modified line (e.g., line 304c); and if the request is for decreasing the contrast, the baseline line is rotated clockwise to generate the modified line (e.g., line 304b). An angle by which the baseline line is rotated is based on the received request. The baseline line can be rotated using an appropriate method, e.g., as discussed herein later.

At 620, based on the modified line, a modified output image is generated (e.g., by the contrast modification module 108), such that the modified output image has a contrast that is different from the contrast of the input image. For example, if the modified line is the line 304b, then the modified output image is the image 112b; and if the modified line is the line 304c, then the modified output image is the image 112c.

In an embodiment, the modified line represents a transfer function between the input image and the modified output image. Thus, the transfer function, which is associated with the input image and the baseline output image, is rotated to generate a new transfer function that is associated with the input image and the modified output image. That is, the contrast of the input image is modified using a rotation of the transfer function.

In an embodiment, the user views the modified output image (e.g., on a display screen associated with the system 100, and/or on a print-out of the modified output image). Based on viewing the modified output image, the user may desire to further modify the contrast of the input image. In such a scenario, the method 600 loops back to 612, where another request is received to further modify the contrast of the input image. The operations at 612, 616 and 620 may be iteratively repeated, until the user is satisfied with the contrast of the modified output image.

Referring again to FIGS. 3 and 6, the rotation of the line 112a may be achieved using an appropriate method. In an example, the graph 300 is in Cartesian coordinate system, and the line 212a is rotated using equations in the Cartesian coordinate system. In another example, the line 212a of the graph 300 is converted from the Cartesian coordinate system to the polar coordinate system, rotated in the polar coordinate system by an appropriate angle (e.g., angle θ1) to generate a modified line (e.g., the line 304b), and the modified line is converted back from the polar coordinate system to the Cartesian coordinate system. The conversion between the Cartesian coordinate system and the polar coordinate system is performed such that the line 112a is rotated about the midpoint (represented by (128, 128) in FIG. 3) of the line 112a.

Figure 7:
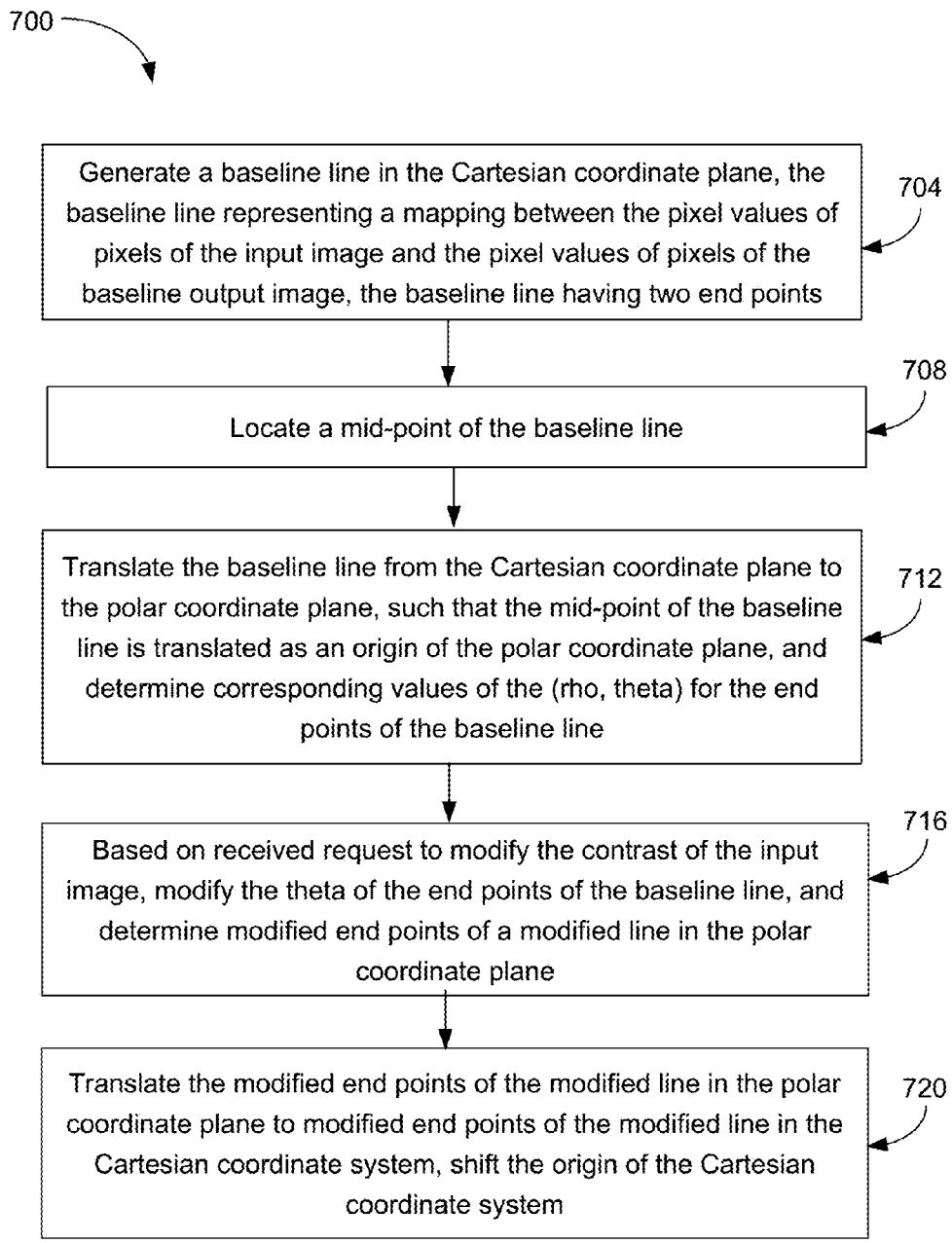
FIG. 7 illustrates an example method for rotating a baseline line representing a mapping between pixel values of pixels of an input image and pixel values of pixels of a baseline output image.

FIG. 7 illustrates an example method 700 for rotating a baseline line representing a mapping between the pixel values of pixels of the input image and the pixel values of pixels of the baseline output image. In an embodiment, the method 700 may be implemented as a part of an operation associated with 616 of the method 600 of FIG. 6.

At 704 of the method 700, a baseline line (e.g., line 304a) is generated (e.g., by the contrast modification module 108) in the Cartesian coordinate plane (i.e., the x-y plane illustrated in FIG. 3), the baseline line representing a mapping between the pixel values of pixels of the input image and the pixel values of pixels of the baseline output image. As illustrated in FIG. 3, the baseline line has two end points and is at an angle of, for example, 45° with the X-axis and the Y-axis.

At 708, a mid-point of the baseline line is located (e.g., by the contrast modification module 108). For the example graph 300 illustrated in FIG. 3, the mid-point of the baseline line 304a is at the coordinate (128, 128). That is, the mid-point of the baseline line is at a middle point between the two end points of the baseline line.

At 712, the baseline line is translated from the Cartesian coordinate plane to the polar coordinate plane, such that the mid-point of the baseline line is translated as an origin of the polar coordinate plane. The shifting of the origin of the polar coordinate plane is, for example, to ensure that the baseline line is rotated about the mid-point of the baseline line. Also, at 712, subsequent to translating to the polar coordinate plane and shifting the origin of the polar coordinate plane, values of (rho, theta) for the end points of the baseline line is determined in the shifted polar coordinate plane.

At 716, based on a received request (e.g., as received by the user input module 116 at 612 of the method 600) to modify the contrast of the input image, the theta of the end points of the baseline line (i.e., the angle of the end points in the polar coordinate system) is modified, and modified end points of a modified line in the polar coordinate plane is determined. For example, if the received request indicates an increase in the contrast, the baseline line is rotated counter-clockwise to generate the modified line. Accordingly, the theta of an end point of the baseline line is increased to generate a modified end point of the modified line. In another example, if the received request indicates a decrease in the contrast, the baseline line is rotated clockwise. Accordingly, the theta of the end point of the baseline line is decreased to generate the modified end point.

In an embodiment, an amount by which the theta of the end point of the line is modified (e.g., increased or decreased) is based on an amount by which the contrast is to be changed (e.g., as indicated in the user input 120 and also in the contrast modification parameter 124).

It is to be noted that the theta of the modified end points ranges from 0° (i.e., the modified line is horizontal, which corresponds to a minimum contrast level) to 90° (i.e., the modified line is vertical, which corresponds to a maximum contrast level). Thus, the maximum angle by which the theta of the end points of the baseline line can be modified (i.e., increased or decreased) is limited by the range of theta.

Once the baseline line is rotated in the polar coordinate system to generate the modified end points, at 720, the modified end points of the modified line in the polar coordinate plane is translated to modified end points of the modified line in the Cartesian coordinate system. Subsequently, the origin of the Cartesian coordinate system is shifted back to the original origin of the Cartesian coordinate system (e.g., to the (0, 0) coordinate of the graph 300 of FIG. 3). The modified end points in the Cartesian coordinate system are then used to generate a linear equation for the modified line in the Cartesian coordinate system. Subsequently, as discussed with respect to FIG. 6, the modified line in the Cartesian coordinate system can be used, for example, to generate a corresponding modified output image having a contrast that is different from the contrast of the input image.

The method 700 to rotate the baseline line is merely an example, and any other appropriate method can be used to rotate the baseline line. For example, the baseline line can be rotated in the Cartesian coordinate system (e.g., without translating the end points in the polar coordinate system).

Following is an example of pseudo code for executing at least a portion of the methods 600 and 700:

```
def contrast_rotate(contrast, bc, wc):
    midpoint=((wc[0]−bc[0])/2+bc[0], (wc[1]−bc[1])/2+bc[1])
    print "midpoint=",midpoint
    bc_normed=(bc[0]−midpoint[0], bc[1]−midpoint[1])
    wc_normed=(wc[0]−midpoint[0], wc[1]−midpoint[1])
    print "normed=",bc_normed, wc_normed
    bc_polar=list(to_polar(*bc_normed))
    wc_polar=list(to_polar(*wc_normed))
    print "polar=", bc_polar, wc_polar
    theta=wc_polar[1]
    if contrast>1.0:
        # increase contrast
        # rotate counterclockwise
        # increase theta (angle) toward vertical
        theta2=(math.pi/2−theta)
        contrast_theta=theta+theta2*(contrast−1.0)
    elif contrast<1.0:
        # decrease contrast
        # rotate clockwise
        # decrease theta (angle) toward horizontal
        theta2=theta
        contrast_theta=theta−theta2*(1.0−contrast)
    else:
        contrast_theta=theta
    # third quadrant
    bc_polar[1]=math.pi+contrast_theta
    wc_polar[1]=contrast_theta
    print "polar theta={0}".format(contrast_theta)
    print "polar rotate={0},{1}".format(bc_polar, wc_polar)
    # clip to vertical/horizontal
    if bc_polar[1]>3*math.pi/2:
        bc_polar[1]=3*math.pi/2
    elif bc_polar[1]<math.pi:
        bc_polar[1]=math.pi
    if wc_polar[1]>math.pi/2:
        wc_polar[1]=math.pi/2
    elif wc_polar[1]<0:
        wc_polar[1]=0
    print "polar clipped=",bc_polar, wc_polar
    # convert polar back to cartesian
    bc_new=to_rect(*bc_polar)
    wc_new=to_rect(*wc_polar)
    print "new=",bc_new, wc_new
    # move back to our offset space
    bc_new2=(bc_new[0]+midpoint[0], bc_new[1]+midpoint[1])
    wc_new2=(wc_new[0]+midpoint[0], wc_new[1]+midpoint[1])
    return bc_new2, wc_new2
```

In accordance with various embodiments, an article of manufacture may be provided that includes a storage medium having instructions stored thereon that, if executed, result in the operations described herein with respect to the methods 600 and/or 700 (and/or various other operations discussed in the present disclosure). In an embodiment, the storage medium comprises some type of non-transitory memory (not shown). In accordance with various embodiments, the article of manufacture may be a computer-readable medium such as, for example, software or firmware.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This disclosure is intended to cover any adaptations or variations of the embodiment disclosed herein. Therefore, it is manifested and intended that the present disclosure be limited only by the claims and the equivalents thereof.

What is claimed is:

1. A method comprising:
    receiving an input image;
    based on the input image, generating a first output image, such that a contrast of the first output image is the same as a contrast of the input image;
    generating a first line in an x-y plane, wherein the first line represents a transfer function between (i) pixel values of pixels of the input image and (ii) pixel values of pixels of the first output image;
    receiving an input to modify the contrast of the input image; and based on receiving the input to modify the contrast of the input image,
- (i) rotating the first line, about a mid-point of the first line, to generate a second line in the x-y plane, wherein each of the first line and the second line is a straight line, and
- (ii) based on the second line, generating a second output image having a contrast that is different from the contrast of the input image.

2. The method of claim 1, further comprising:
based on receiving the input to modify the contrast of the input image, determining an angle by which the first line is to be rotated,
wherein rotating the first line further comprises
rotating the first line by the determined angle to generate the second line.

3. The method of claim 1, wherein receiving the input to modify the contrast of the input image further comprises:
receiving the input to increase the contrast of the input image by a certain percentage; and
based on the certain percentage, determining an angle by which the first line is to be rotated,
wherein rotating the first line further comprises
based on receiving the input to increase the contrast of the input image, rotating the first line counter-clockwise by the determined angle to generate the second line.

4. The method of claim 1, wherein receiving the input to modify the contrast of the input image further comprises:
receiving the input to decrease the contrast of the input image by a certain percentage; and
based on the certain percentage, determining an angle by which the first line is to be rotated,
wherein rotating the first line further comprises
based on receiving the input to decrease the contrast of the input image, rotating the first line clockwise by the determined angle to generate the second line.

5. The method of claim 1, wherein:
the first line has a first end point and a second end point;
the method further comprises
based on the first end point and the second end point of the first line, determining the mid-point of the first line.

6. The method of claim 5, wherein:
the x-y plane represents a first Cartesian coordinate system;
the method further comprises based on receiving the input to modify the contrast of the input image, determining a first angle by which the first line is to be rotated; and
rotating the first line to generate the second line further comprises
translating the x-y plane of the first Cartesian coordinate system to polar coordinate system, such that the mid-point of the first line forms an origin of the polar coordinate system,
translating coordinates of the first end point and the second end point from the Cartesian coordinate system to the polar coordinate system,
modifying the coordinates of the first end point and the second end point in the polar coordinate system by the first angle,
translating the coordinates of the first end point and the second end point from the polar coordinate system to a second Cartesian coordinate system,
modifying the second Cartesian coordinate system to generate a third Cartesian coordinate system, such that an origin of the third Cartesian coordinate system coincides with an origin of the first Cartesian coordinate system, and
based on the coordinates of the first end point and the second end point in the third Cartesian coordinate system, generating the second line.

7. The method of claim 1, further comprising:
providing, to a user, a dial to modify the contrast of the input image.

8. The method of claim 7, wherein receiving the input to modify the contrast of the input image further comprises:
in response to the user rotating the dial in one of a clockwise direction and a counter-clockwise direction, receiving the input to increase the contrast of the input image; and
in response to the user rotating the dial in another of the clockwise direction and the counter-clockwise direction, receiving the input to decrease the contrast of the input image.

9. The method of claim 7, wherein receiving the input to modify the contrast of the input image further comprises:
in response to the user rotating the dial, receiving the input to modify the contrast of the input image such that an amount by which the contrast is to be modified is based on an angle by which the dial is rotated.

10. The method of claim 1, further comprising:
outputting the second output image.

11. An image processing system comprising:
a user input module configured to receive an input from a user to modify a contrast of an input image; and
a contrast modification module configured to
receive the input image,
based on the input image, generate a first output image, such that a contrast of the first output image is the same as a contrast of the input image,
generate a first line in an x-y plane, wherein the first line represents a transfer function between (i) pixel values of pixels of the input image and (ii) pixel values of pixels of the first output image, and
based on the input to modify the contrast of the input image,
- (i) rotate the first line, about a mid-point of the first line, to generate a second line in the x-y plane, wherein each of the first line and the second line is a straight line, and
- (ii) based on the second line, generate a second output image having a contrast that is different from the contrast of the input image.

12. The image processing system of claim 11, wherein the contrast modification module is further configured to:
based on the input to modify the contrast of the input image, determine an angle by which the first line is to be rotated; and
rotate the first line by the determined angle to generate the second line.

13. The image processing system of claim 11, wherein the contrast modification module is further configured to:
receive the input to increase the contrast of the input image by a certain percentage;
based on the certain percentage, determine an angle by which the first line is to be rotated; and
based on the input to increase the contrast of the input image, rotate the first line counter-clockwise by the determined angle to generate the second line.

14. The image processing system of claim 11, wherein the contrast modification module is further configured to:

receive the input to decrease the contrast of the input image by a certain percentage;

based on the certain percentage, determine an angle by which the first line is to be rotated; and based on the input to decrease the contrast of the input image, rotate the first line clockwise by the determined angle to generate the second line.

15. The image processing system of claim 11, wherein the first line has a first end point and a second end point, and wherein the contrast modification module is further configured to:

based on the first end point and the second end point of the first line, determine the mid-point of the first line.

16. The image processing system of claim 15, wherein the x-y plane represents a first Cartesian coordinate system, and wherein the contrast modification module is further configured to:

based on the input to modify the contrast of the input image, determine a first angle by which the first line is to be rotated; and rotate the first line to generate the second line by
translating the x-y plane of the first Cartesian coordinate system to polar coordinate system, such that the mid-point of the first line forms an origin of the polar coordinate system, translating coordinates of the first end point and the second end point from the Cartesian coordinate system to the polar coordinate system, modifying the coordinates of the first end point and the second end point in the polar coordinate system by the first angle, translating the coordinates of the first end point and the second end point from the polar coordinate system to a second Cartesian coordinate system, modifying the second Cartesian coordinate system to generate a third Cartesian coordinate system, such that an origin of the third Cartesian coordinate system coincides with an origin of the first Cartesian coordinate system, and based on the coordinates of the first end point and the second end point in the third Cartesian coordinate system, generating the second line.

17. The image processing system of claim 11, wherein the user input module is further configured to receive the input to modify the contrast of the input image by:

providing, to a user, a dial to modify the contrast of the input image.

18. The image processing system of claim 17, wherein the user input module is further configured to receive the input to modify the contrast of the input image by:

in response to the user rotating the dial in one of a clockwise direction and a counter-clockwise direction, receiving the input to increase the contrast of the input image; and in response to the user rotating the dial in another of the clockwise direction and the counter-clockwise direction, receiving the input to decrease the contrast of the input image.

19. The image processing system of claim 17, wherein the user input module is further configured to receive the input to modify the contrast of the input image by:

in response to the user rotating the dial, receiving the input to modify the contrast of the input image such that an amount by which the contrast is to be modified is based on an angle by which the dial is rotated.

20. The image processing system of claim 11, wherein the image processing system is included in one of a scanning device, a photo copier, or a multi-function printer.

* * * * *